United States Patent
Chen et al.

(10) Patent No.: US 8,310,524 B2
(45) Date of Patent: Nov. 13, 2012

(54) STEREOSCOPIC IMAGE DISPLAY APPARATUS

(75) Inventors: Wu-Li Chen, Changhua County (TW);
Wei-Liang Hsu, Taipei (TW);
Chang-Shuo Wu, Taipei County (TW);
Ming-Chieh Yang, Miaoli County (TW);
Chao-Hsu Tsai, Hsinchu (TW); Kuen Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 617 days.

(21) Appl. No.: 12/487,652

(22) Filed: Jun. 19, 2009

(65) Prior Publication Data

US 2010/0123952 A1    May 20, 2010

(30) Foreign Application Priority Data

Nov. 18, 2008   (TW) ............................. 97144537 A

(51) Int. Cl.
*H04N 13/00* (2006.01)
*H04N 13/04* (2006.01)
(52) U.S. Cl. .......................................... 348/42; 348/51
(58) Field of Classification Search .................. 348/47,
348/42, 51, 44, 36, 52, 54, 70, 57, 56, 345,
348/48, 49, 50; 359/462, 464, 465, 31, 458,
359/478, 30, 466, 472, 477; 396/325, 216
See application file for complete search history.

(56) References Cited

U.S. PATENT DOCUMENTS

| | | | | |
|---|---|---|---|---|
| 4,987,487 A | * | 1/1991 | Ichinose et al. ............... 348/59 |
| 5,315,377 A | | 5/1994 | Isono et al. |
| 5,808,792 A | * | 9/1998 | Woodgate et al. ........... 359/463 |
| 5,861,936 A | * | 1/1999 | Sorensen ....................... 351/200 |
| 5,959,664 A | * | 9/1999 | Woodgate ..................... 348/59 |
| 6,932,476 B2 | | 8/2005 | Sudo et al. |
| 6,999,071 B2 | | 2/2006 | Balogh |
| 7,084,841 B2 | | 8/2006 | Balogh |
| 7,616,885 B2 | * | 11/2009 | Chen et al. .................... 396/324 |
| 7,646,451 B2 | * | 1/2010 | Vogel et al. .................... 349/70 |
| 2002/0051118 A1 | | 5/2002 | Takagi et al. |
| 2007/0096125 A1 | | 5/2007 | Vogel et al. |
| 2008/0080852 A1 | | 4/2008 | Chen et al. |

(Continued)

FOREIGN PATENT DOCUMENTS

JP          02-050145          2/1990

(Continued)

OTHER PUBLICATIONS

"1st Office Action of China Counterpart Application", issued on Dec. 31, 2010, p. 1-p. 5.

(Continued)

*Primary Examiner* — Behrooz Senfi
(74) *Attorney, Agent, or Firm* — Jianq Chyun IP Office

(57) ABSTRACT

A stereoscopic image display apparatus having a function for tracking at least one observer is provided. The stereoscopic image display apparatus includes a detection and calculation module and a display unit. The detection and calculation module detects the position of the observer to configure N views of a displayed image corresponding to two eyes of the observer, and outputs a control information, wherein $N \geq 4$. The display unit receives the control information and generates N view images corresponding to the N views. Each eye of the observer receives at least two view images, and the two eyes respectively receive multiple view images in different views.

18 Claims, 7 Drawing Sheets

U.S. PATENT DOCUMENTS

2010/0060983 A1* 3/2010 Wu et al. .................. 359/466

FOREIGN PATENT DOCUMENTS

KR 1020080050821 6/2008

OTHER PUBLICATIONS

Yoshihiro Kajiki et al. "Hologram-Like Video Images by 45-View Stereoscopic Display", SPIE vol. 3012, Dec. 31, 1997, p. 154-p. 166.

Ryuji Inagaki et al., "Development of pupil-position detection system for Super Multi-View 3-D display", Technical Report of IEICE, Dec. 31, 2001, p. 75-p. 80.

"Second Office Action of China Counterpart Application", issued on Mar. 12, 2012, p. 1-p. 6.

"Office Action of Taiwan Counterpart Application", issued on Apr. 18, 2012, p. 1-p. 19.

* cited by examiner

STEREOSCOPIC IMAGE DISPLAY APPARATUS

CROSS-REFERENCE TO RELATED APPLICATION

This application claims the priority benefit of Taiwan application serial no. 97144537, filed on Nov. 18, 2008. The entirety of the above-mentioned patent application is hereby incorporated by reference herein and made a part of specification.

BACKGROUND

1. Technical Field

The present invention generally relates to a stereoscopic image display apparatus which tracks the position of an observer to generate a stereoscopic image.

2. Description of Related Art

Stereoscopic display is expected to be the mainstream among next-generation displays. An existing stereoscopic display presents images having parallaxes to a viewer, wherein the stereoscopic image effect is produced through the parallaxes. In a display, a time division multiplexing or a space division multiplexing may be adopted in order to give two eyes images of different parallaxes.

Regarding a stereoscopic display adopting the space division multiplexing, when an image is displayed, the resolution is usually evenly distributed to different views and multiple view images are displayed at the same time. Because different view images produce different parallaxes, the left eye and the right eye respectively receive images in different views and accordingly the stereoscopic image effect is produced. The more the views are, the more freely the observer is allowed to move. However, regarding a display having a fixed resolution, the resolution of a single view image is reduced when multiple view images corresponding to one single image are displayed. Thus, the number of views and the resolution cannot be taken care of together. Regarding a stereoscopic display adopting the time division multiplexing, based on the Visual staying phenomenon of the eyes, images in different views are sequentially sent to the left eye and the right eye within a short period (for example, 1/60 second) to achieve the stereoscopic image effect without reducing the resolution of the image. However, a broad bandwidth is required for playing the stereoscopic images because multiple view images need to be sent out within a short time.

The basic theory of visual effect of stereoscopic image will be described first. FIGS. 1A-1B are diagram illustrating the visual effect of a stereoscopic image. Referring to FIG. 1A, when a left eye 100a and a right eye 100b look at an object 102, a parallax is produced between the sight lines 104 of the left eye 100a and the right eye 100b and accordingly a stereoscopic effect is produced. Besides, because the two eyes have the same accommodation and convergence, a stereoscopic object is clearly presented.

Referring to FIG. 1B, when images corresponding to the two eyes are displayed through a flat panel display device 106, the accommodation of the sight line 104a of the left eye 100a falls on a position of the display device 106, and the accommodation of the sight line 104b of the right eye 100b falls on another position of the display device 106. Even though two different accommodations are produced by displaying plane images, the sight lines 104a and 104b are extended backwards into sight lines 108, wherein the intersection of the sight lines 108 is the convergence which is corresponding to the convergence of the actual object 102. Thus, a stereoscopic effect can still be produced by displaying plane images. However, since the accommodation and the convergence do not overlap, discomfort to the eyes may be caused.

FIG. 2 is a diagram illustrating a mechanism of a conventional stereoscopic image display apparatus. Referring to FIG. 2, two images 114a and 114b of an object 112 which have a parallax are respectively displayed on a display plane and provided to two eyes 100a and 100b. The parallax produces a stereoscopic visual effect of the object 112. However, as described above, discomfort may be produced to the eyes.

FIG. 3 is a diagram illustrating another mechanism of a conventional stereoscopic image display apparatus. Referring to FIG. 3, a single eye receives a plurality of view images so that problems caused by inconsistent accommodation and convergence are reduced. For example, a left eye 100a looks at two view images 114a and 116a in different views on a display plane, and a right eye 100b looks at two view images 114b and 116b in different views on the display plane. Thus, a virtual physical object 112 can be established. This technique requires images of high view density therefore is referred to as a supper-multi-view (SMV) display technique.

FIG. 4 is a diagram of the requirement and arrangement of view number according to the conventional SMV technique. Referring to FIG. 4, the distance between the pupils of two eyes is usually between 2 mm and 4 mm. If the distance between two pupils is assumed to be 65 mm and each eye receives at least two views, the widths of the views would be less than 2 mm. Accordingly, about 32 views are required. If the observer is allowed to turn his head, more views are required.

Many different designs have been provided in the conventional techniques. A method of scanning lenticular array devices by using laser is provided in U.S. Pat. No. 6,932,476, wherein each lenticular lens projects the light to a view. When the lenticular array devices are scanned, an image is displayed by using a liquid crystal display (LCD). Other views are produced by slightly displacing the lenticular array devices. Then, the light beam of the image is deflected by a light refraction device back to the perpendicular direction and enters the LCD to display images in different views. Through the mechanism described above, views of high density can be achieved and a high-density image display can be achieved.

A technique of projecting an image to a lenticular lens array screen by using a plurality of projects to increase the total pixel number of the image is provided in U.S. Pat. No. 6,999,071. Each lenticular lens of the lenticular lens array screen collects pixels projected by each of the projectors and distributes them to different parts in the space. As a result, the image is expanded horizontally and vertically by the lenticular lens array screen.

There are further different designs for displaying stereoscopic images, such as the U.S. Pat. No. 7,084,841 and 2002/0051118, etc. However, foregoing techniques respectively have their pros and cons due to the focuses thereof.

SUMMARY

The present disclosure provides a stereoscopic image display apparatus having a function for tracking at least one observer. The stereoscopic image display apparatus includes a detection and calculation module and a display unit. The detection and calculation module detects the position of the observer and configures N views of a displayed image corresponding to two eyes of the observer, and the detection and calculation module outputs a control information, wherein $N \geq 4$. The display unit receives the control information and generates N view images corresponding to the N views. Each of the two eyes of the observer receives at least two view images, and the view images received by the two eyes respectively belong to different views.

The present disclosure provides another stereoscopic image display apparatus including a display unit, a light source module, an optical module, and a detection and calculation module. The display unit displays a plurality of view images. The light source module provides a light source to the display unit to display the view images. The optical module projects the view images at different positions on the display unit to a viewing space from different directions for two eyes of an observer, wherein each of the eyes receive at least two of the view images. The detection and calculation module detects two positions of the two eyes of the observer, calculates an image information, and controls the display unit to display the view images regarding the two positions of the two eyes of the observer.

The present disclosure provides yet another stereoscopic image display apparatus including a display unit, a light source module, a light blocking module, and a detection and calculation module. The display unit displays an image information and sequentially displays a plurality of view images of different views at a display rate within a unit time. The light source module synchronously provides a light source to the display unit to generate an image of the image information and the view images. The light blocking module blocks the image or allows the image to pass at a frequency, respectively assign the view images having different parallax to two eyes of an observer through time division multiplexing, and provides at least two of the view images to each of the eyes within a unit time. The detection and calculation module detects two positions of the two eyes of the observer, calculates the image information, and controls the display unit to display regarding the two positions of the two eyes of the observer.

The present disclosure further provides a stereoscopic image display method. In this method, two positions of two eyes of an observer are detected. A plurality of pre-arranged view images are issued according to the two positions. The view images are sent to a display unit to be displayed. The view images are distributed on a viewing space at different directions according to a plurality of position regions on the display unit. Foregoing steps are executed repeatedly.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
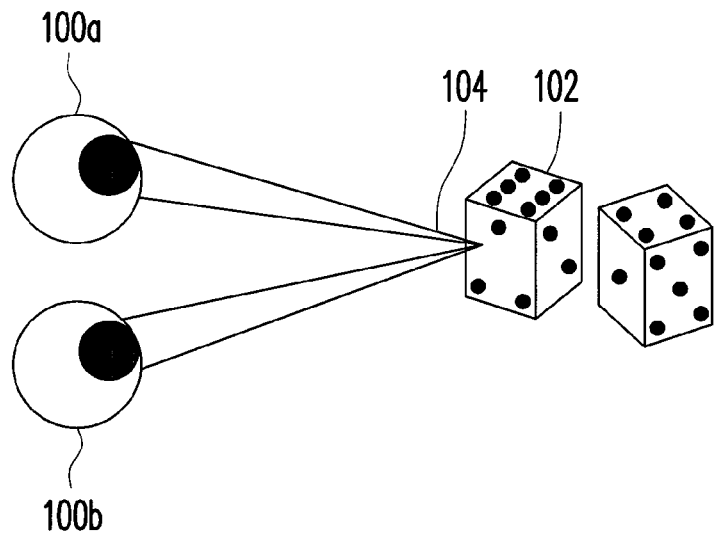
FIGS. 1A-1B are diagram illustrating the visual effect of a stereoscopic image.
Figure 1B:
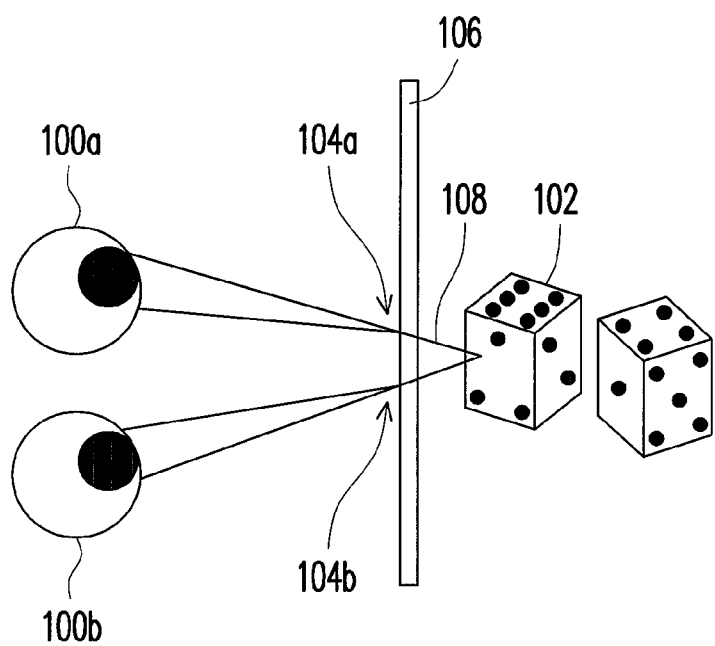
Figure 2:
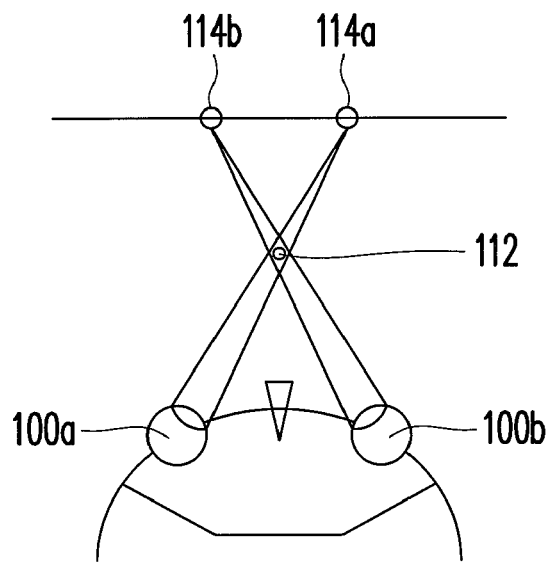
FIG. 2 is a diagram illustrating a mechanism of a conventional stereoscopic image display apparatus.
Figure 3:
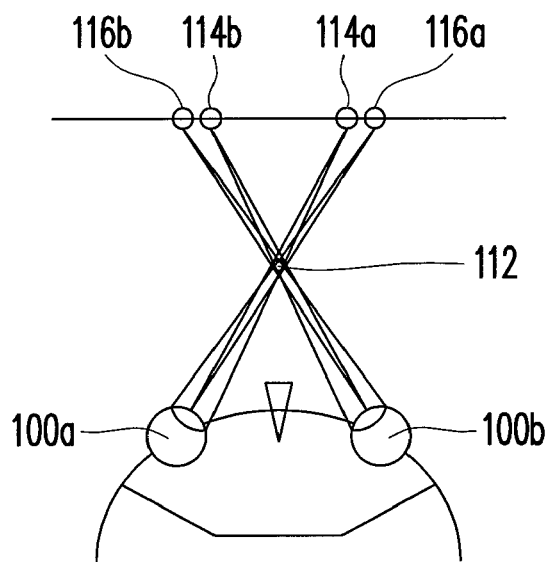
FIG. 3 is a diagram illustrating another mechanism of a conventional stereoscopic image display apparatus.
Figure 4:
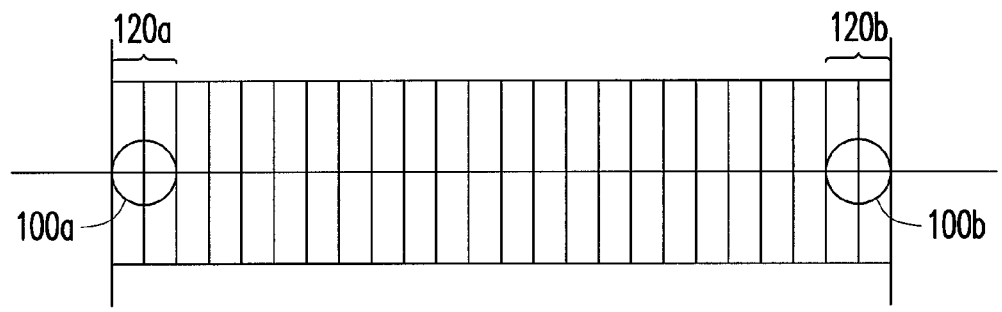
FIG. 4 is a diagram of the requirement and arrangement of view number according to the conventional SMV technique.

Reference will now be made in detail to the present preferred embodiments of the disclosure, examples of which are illustrated in the accompanying drawings. Wherever possible, the same reference numbers are used in the drawings and the description to refer to the same or like parts.

In the present disclosure, a new stereoscopic image display technique is accomplished by adopting a function for tracking an observer and a multi-view stereoscopic display mechanism. A stereoscopic image display apparatus provided by the present disclosure may adopt the time division multiplexing mechanism or the space division multiplexing mechanism. Embodiments of the present disclosure will be described below. However, these embodiments are not intended for limiting the scope of the disclosure. Besides, some of the embodiments may be combined appropriately to produce other different embodiments of the present disclosure.

Figure 5:
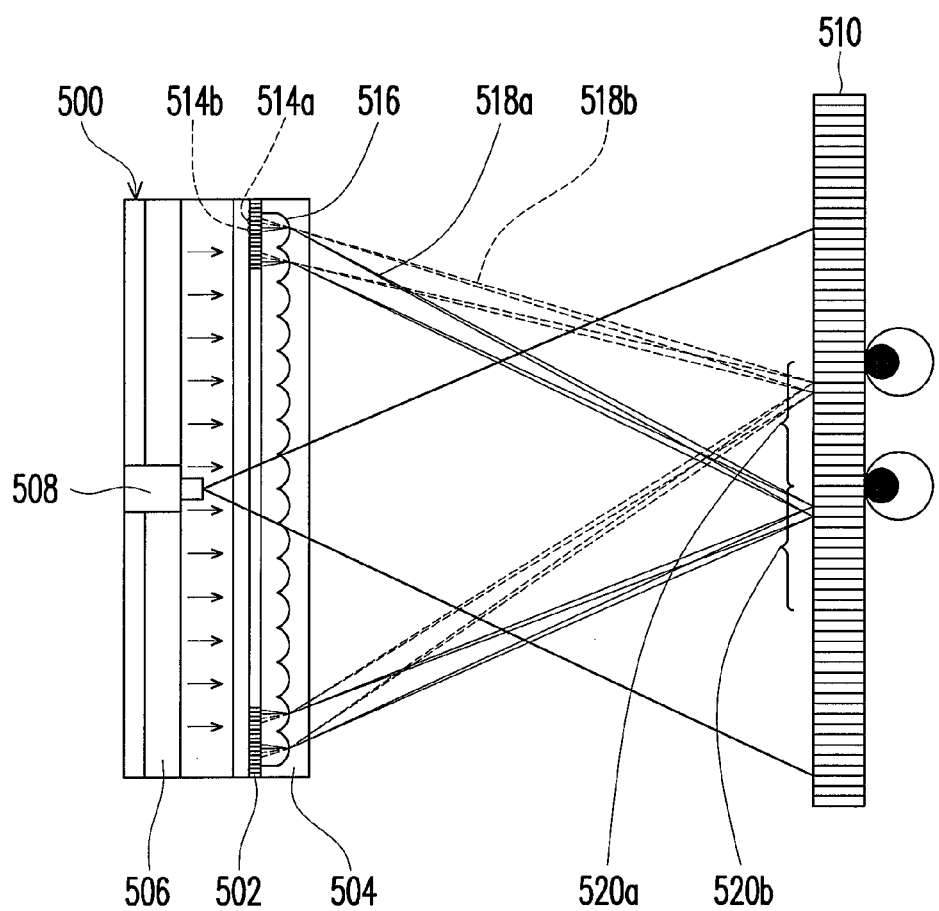
FIG. 5 is a diagram of a stereoscopic image display apparatus according to an embodiment of the present disclosure.

A stereoscopic image display apparatus adopting the space division multiplexing mechanism will be described first. FIG. 5 is a diagram of a stereoscopic image display apparatus according to an embodiment of the present disclosure. Referring to FIG. 5, the stereoscopic image display apparatus includes a display unit 500 and a detection and calculation module 508. The display unit 500 includes a grating array 502, such as a liquid crystal display (LCD) panel. The grating array 502 has a pixel array for displaying an image, wherein the grating array 502 displays the image with pixel array according to the desired view images. A light source module 506 (for example, a backlight module) provides a light source for displaying the image according to the display pattern of a display panel 502. The display panel 504 uses the grating array 502 controlling the on/off of the backlight and controls the direction of the backlight through a lenticular array plate 516 to project the backlight according to a predetermined position to the two eyes of an observer in a viewing space 510. As a result, the observer can view a plurality of view images having parallaxes, and each of the eyes of the observer receives at least two view images. The viewing space 510 is a predetermined space but not a physical object. The positions of two areas 520a and 520b in the viewing space 510 are corresponding to the positions of the two eyes and changes along with the displacement of the two eyes. The mechanism will be described in detail below.

The positions of the two eyes of the observer are detected by a detection and calculation module 508 so that N views of a display image corresponding to the positions of the two eyes can be configured and a control information can be output for controlling the display of the grating array 502 and the display panel 504. In order to allow each of the eyes to receive at least two view images, N would be at least 4. Namely, the number of view images displayed by the grating array 502 would be at least 4. The detection and calculation module 508 constantly tracks the positions of the two eyes to adjust the position of the displayed content of the grating array 502 and the display panel 504 dynamically.

Taking the space division multiplexing mechanism as an example, the pixels are distributed into a left eye view image 514a and a right eye view image 514b. The terms "left eye" and "right eye" are only used here for the convenience of description but not for limiting the present disclosure. The left eye view image 514a and the right eye view image 514b respectively receive at least two view images to achieve a super multi-view effect. The display unit 500 includes a grating array, a lenticular array plate, or a microlens array plate and projects image lights of multiple view images to the two eyes of the observer through accommodation and deflection.

Taking the lenticular array plate 516 as an example, each lenticular lens is corresponding to a plurality of view images of a pixel. The lenticular lens deflects two pixel of the left eye view image 514a into the left eye through a path 518a and deflects two pixels of the right eye view image 514b into the right eye through a path 518b.

The detection and calculation module 508 in the stereoscopic image display apparatus has a detection unit and a calculation unit. The detection unit tracks the positions of the two eyes of the observer. The calculation unit calculates an information obtained by the detection unit and controls the grating array 502 and the display panel 504 to display a plurality of view images having parallaxes corresponding to the positions of the two eyes.

In addition, the detection unit may further include an image capturing device for capturing an image and calculating the two positions of the two eyes of the observer. In another embodiment of the present disclosure, the detection unit may further include a light beam emitting device which obtains the two positions of the two eyes of the observer through information calculation of a reflected light. In yet another embodiment of the present disclosure, the detection unit may further include a sound wave emitting device which determines the two positions of the two eyes of the observer through information calculation of a reflected sound wave. Substantially, the pupils of the observer need not to be tracked precisely; instead, only the positions of the eyes would be identified.

In addition, according to the requirement, N view images generated by the display unit 500 are repeated in the viewing space. Thus, each eye of the observer can observe at least two views at any time, and the stereoscopic image visual effect can be achieved through the parallaxes between the left eye and the right eye.

The rule remains the same when the stereoscopic image display apparatus in the present disclosure adopts the time division multiplexing mechanism. However, the view images which respectively enter the left eye and the right eye would be blocked sequentially within a time period, the grating array 502 and the display panel 504 sequentially displays a plurality of view images in different views according to the display rate within a unit time (for example, 1/60 second). In addition, the grating array 502 may have a light blocking module which blocks the image or allows the image to pass through according to a frequency, so as to respectively provide the view images having different parallaxes to the two eyes of the observer through time division multiplexing. The detection and calculation module 508 detects the positions of the two eyes of the observer and processes an image information, and controls the displayed content of the display panel 504 according to the positions of the two eyes of the observer.

Figure 6:
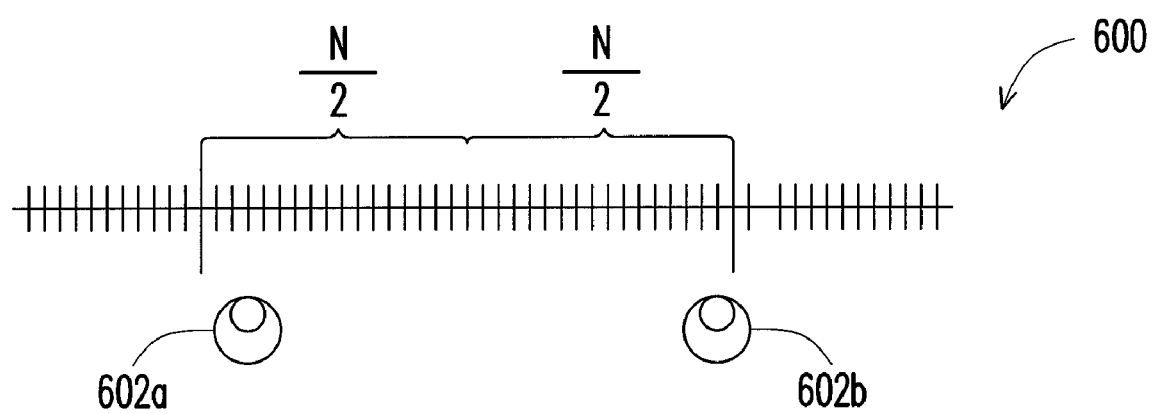
FIG. 6 is a diagram of a configuration of view images according to an embodiment of the present disclosure.

FIG. 6 is a diagram of a configuration of view images according to an embodiment of the present disclosure. Referring to FIG. 6, the views are distributed in the viewing space 600 corresponding to the detected left eye position 602a and the detected right eye position 602b by taking a middle point between the eyes as a reference point. There are N (at least four) views, and each of the eyes can receive at least two of the view images. Each pixel in a stereoscopic image is displayed with N views in order to achieve the stereoscopic image visual effect. In the present embodiment, the middle point between the two eyes is used as the reference point for dividing the N view images into two groups, and each of the two eyes respectively receives N/2 views at most. In the present embodiment, those views in the middle are not observed and accordingly idle views are produced.

Figure 7:
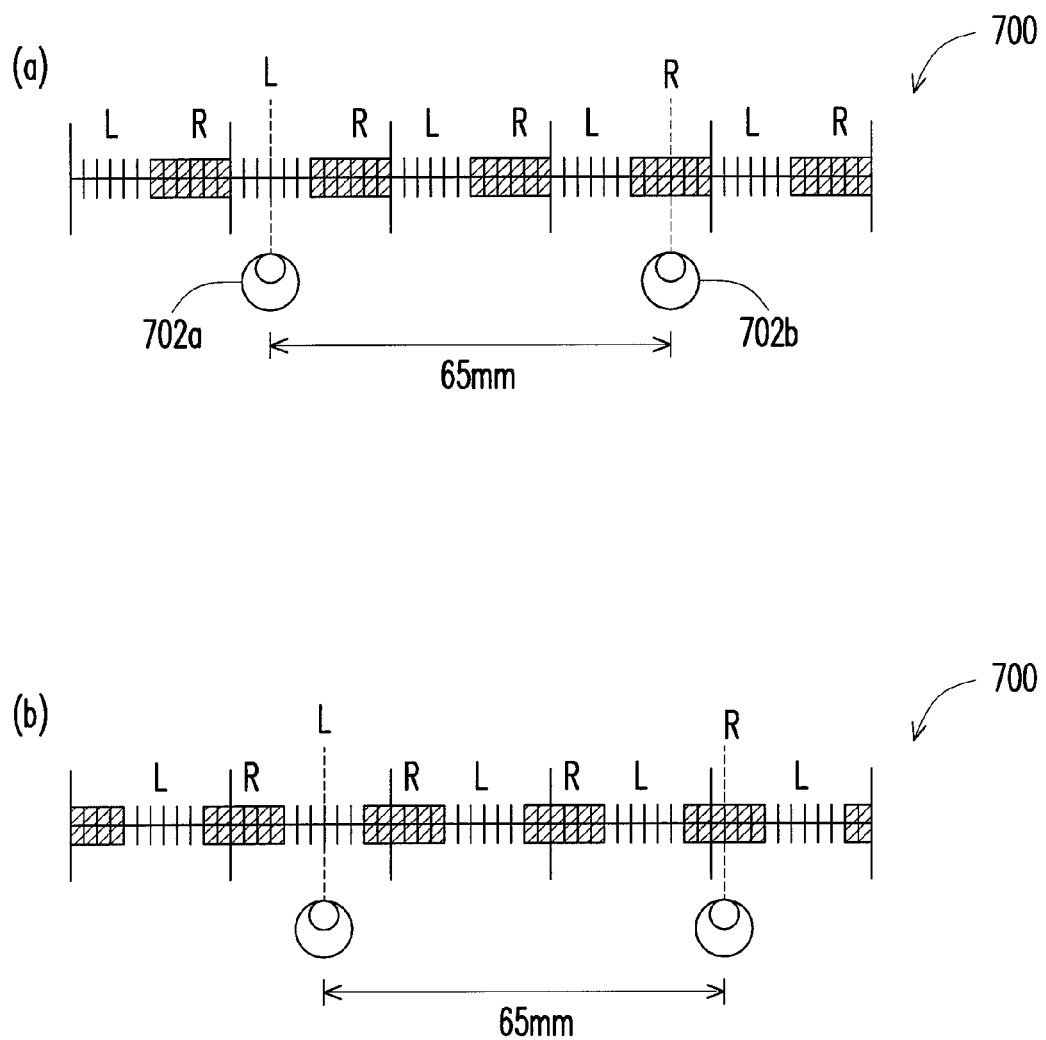
FIG. 7 is a diagram of a configuration of view images according to another embodiment of the present disclosure.

A more effective configuration method is provided regarding the embodiment illustrated in FIG. 6. FIG. 7 is a diagram of a configuration of view images according to another embodiment of the present disclosure. Referring to FIG. 7, since the views in the middle between the two eyes do not enter the eyes, a smaller left eye area L and a smaller right eye area R are configured with a view image density in which each eye can observe multiple view images, as shown in FIG. 7(a). For example, if there are 12 views (i.e., N=12), 12/2 view images corresponding to the left eye position 702a are sent to the 12/2 views centred on the left eye, and 12/2 view images corresponding to the right eye position 702b are sent to the 12/2 views centred on the right eye. Accordingly, the number of views corresponding to each group of view images is reduced, and accordingly the resolution is maintained at certain degree.

Referring to FIG. 7(b), when the observer moves, the positions of the eyes of the observer also move. Thus, the view images in the viewing space 700 also move along with the observer, and images in different views are produced at both the left eye position 702a and the right eye position 702b so that a stereoscopic image visual effect is achieved.

The display method of the present disclosure will be described herein. Two positions of two eyes of an observer are detected, and a plurality of view images pre-configured or analyzed according to the two positions is sent out to a display unit to be displayed. The view images are distributed on a viewing space from different directions according to a plurality of position regions on the display unit. Foregoing steps are repeated.

Figure 8:
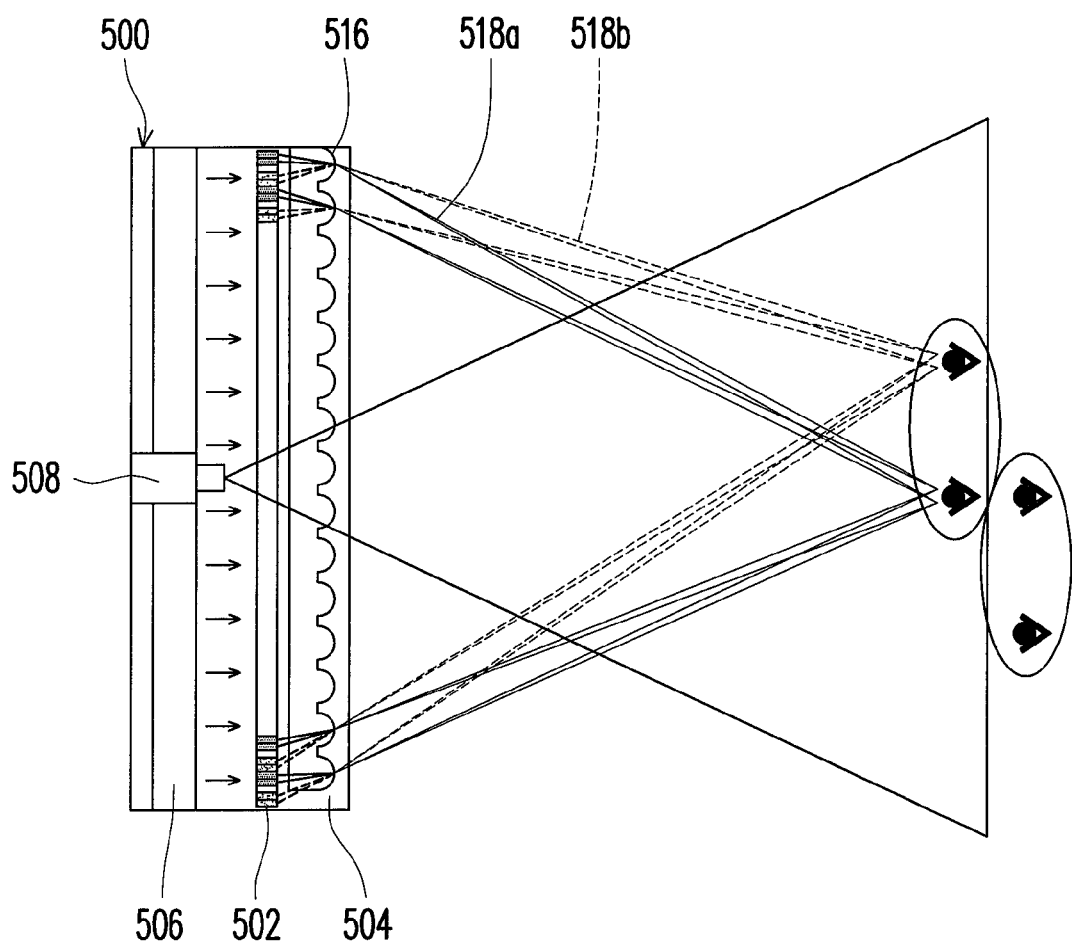
FIGS. 8-9 illustrate a view having two observers according to an embodiment of the present disclosure.
Figure 9:
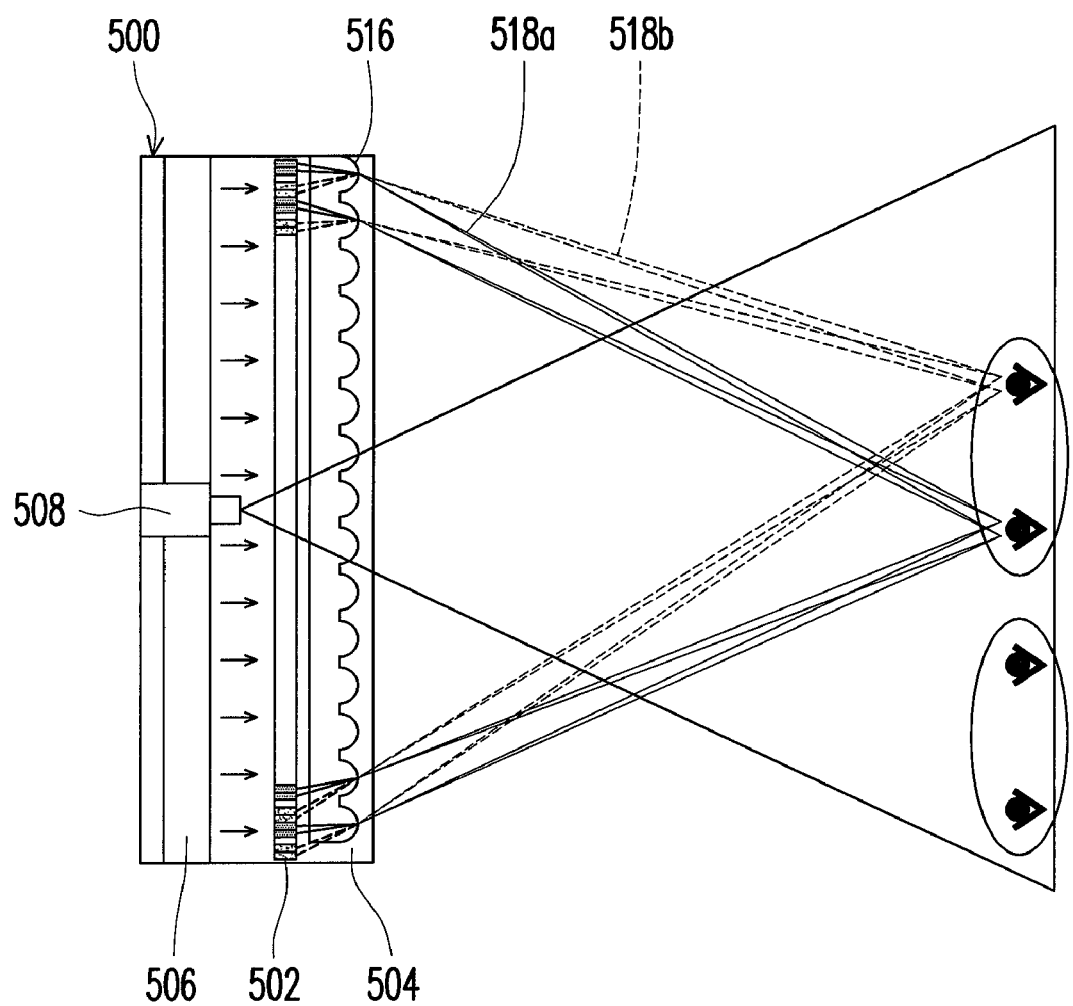

Foregoing embodiments are described with only one observer. However, the present disclosure is applicable to the cases wherein there are multiple observers. Generally speaking, the number N of views can be appropriately increased according to the number of observers to be tracked, but the same mechanism is applied. FIGS. 8-9 illustrate a view having two observers according to an embodiment of the present disclosure. Referring to FIG. 8, if there are two observers, and one eye of one of the observers overlaps with one eye of the other observer, there could be at least 6 views, wherein two views are respectively corresponding to M=3 eyes. Referring to FIG. 9, if the eyes of two observer do not overlap with each other (i.e., there are four different eye positions), the number of views would be at least 8. Each of the eyes receives at least two view images. However, if both eyes of the two observers overlap with each other and only the observation heights of the two observers are different, the same configuration when there is only one observer can be used. Similarly, configuration when there are more observers can also be specified. However, the resolution of the image will be decreased relatively, which would be appropriately changed according to the actual requirement.

In the display mechanism provided by the present disclosure, only the positions of two eyes are detected so that no discomfort will be produced to the eyes. In addition, a supper-multi-view (SMV) effect can be achieved through configuration of view images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereoscopic image display apparatus, having a function for tracking at least one observer, the stereoscopic image display apparatus comprising:
 a detection and calculation module, for detecting two positions of two eyes of the observer to configure N views of a displayed image corresponding to the two positions, and for outputting a control information, wherein $N \geq 4$; and
 a display unit, for receiving the control information, and displaying N view images corresponding to the N views, wherein the each of the two eyes receives at least two of the view images, and the view images received by the two eyes respectively belong to different views,
 wherein 2n positions of eyes are generated corresponding to n observer, and a relationship between the N and n is as following:
 $N \geq 4$ when n=1 and positions corresponding to two eyes are generated;
 $N \geq 4n$ when $n \geq 2$, the positions of the eyes do not overlap each other, and positions corresponding to 2n eyes are generated;
 $N \geq 2M$ when $n \geq 2$ and the positions of the eyes overlap each other according to the number M of unoverlapped eye positions.

2. The stereoscopic image display apparatus according to claim 1, wherein the display unit comprises:
 an image display panel, for generating a plurality of image pixel arrays respectively for the N view images; and
 a view regulator, for regulating the N view images to be projected on the two positions of the two eyes of the observer.

3. The stereoscopic image display apparatus according to claim 2, wherein the view regulator comprises a grating array, a lenticular array plate, or a microlens array plate, and the view regulator projects an image light of the N view images to the two eyes of the observer through focusing and deflection.

4. The stereoscopic image display apparatus according to claim 1, wherein the detection and calculation module comprises:
 a detection unit, for finding the two positions of the two eyes of the observer; and
 a calculation unit, for calculating an information obtained by the detection unit, and controlling the display unit through analysis and calculation, and displaying the view images having parallax corresponding to the two positions.

5. The stereoscopic image display apparatus according to claim 4, wherein the detection unit comprises:
 an image capturing device, for capturing an image and obtaining the two positions of the two eyes of the observer through calculation.

6. The stereoscopic image display apparatus according to claim 4, wherein the detection unit comprises:
 a light beam emitting device, for obtaining the two positions of the two eyes of the observer through information calculation of a reflected light.

7. The stereoscopic image display apparatus according to claim 4, wherein the detection unit comprises:
 a sound wave emitting device, for determining the two positions of the two eyes of the observer through information calculation of a reflected sound wave.

8. The stereoscopic image display apparatus according to claim 1, wherein the N view images generated by the display unit are revolved in a viewing space so that each of the two eyes of the observer can observe at least two views.

9. The stereoscopic image display apparatus according to claim 1, wherein a middle point of the two eyes is taken as a reference point in a spatial distribution of the N views, and N/2 of the N views is respectively distributed at the left and the right of the middle point and is respectively corresponding to the two eyes.

10. The stereoscopic image display apparatus according to claim 1, wherein a spatial distribution of the N views divide the N views into two groups, and N/2 of the N views is respectively corresponding to the two eyes.

11. A stereoscopic image display apparatus, comprising:
 a display unit, for displaying a plurality of view images having N views;
 a light source module, for providing a light source to the display unit to display the view images;
 an optical module, for projecting the view images on different positions on the display unit to a viewing space from different directions for two eyes of an observer, wherein each of the two eyes receives at least two of the view images; and
 a detection and calculation module, for detecting two positions of the two eyes of the observer and processing the image information, and controlling the display unit regarding the two positions of the two eyes of the observer to display the view images,
 wherein the observer is n observer, and 2n positions of eyes are generated corresponding to the n observer, and a relationship between the N and n is as following:
 $N \geq 4$ when n=1 and positions corresponding to two eyes are generated;
 $N \geq 4n$ when $n \geq 2$, the positions of the eyes do not overlap each other, and positions corresponding to 2n eyes are generated;
 $N \geq 2M$ when $n \geq 2$ and the positions of the eyes overlap each other according to the number M of unoverlapped eye positions.

12. The stereoscopic image display apparatus according to claim 11, wherein the N views are distributed in the viewing space with a middle point of the two eyes as a reference point, and N/2 of the N views is respectively distributed at the left and the right of the middle points and is respectively corresponding to the two eyes.

13. The stereoscopic image display apparatus according to claim 11, wherein the distribution of the N views in the viewing space is to divide the N views into two groups, and N/2 of the N views is respectively corresponding to the two eyes.

14. A stereoscopic image display apparatus, comprising:
 a display unit, for displaying an image information and sequentially displaying a plurality of view images of different views within a unit time at a display rate, the view images having N views;
 a light source module, for synchronously providing a light source to the display unit to generate an image of the image information, and for generating the view images;
 a light blocking module, for blocking the image or allowing the image to pass according to a frequency, and respectively providing the view images having different parallaxes to two eyes of an observer through time division multiplexing, and providing at least two of the view images to each of the two eyes within the unit time; and
 a detection and calculation module, for detecting two positions of the two eyes of the observer, and processing the image information, and controlling the display unit according to the two positions of the two eyes of the observer, wherein the observer is n observer, and 2n positions of eyes are generated corresponding to the n observer, and a relationship between the N and n is as following:

$N \geq 4$ when n=1 and positions corresponding to two eyes are generated;

$N \geq 4n$ when $n \geq 2$, the positions of the eyes do not overlap each other, and positions corresponding to 2n eyes are generated;

$N \geq 2M$ when $n \geq 2$ and the positions of the eyes overlap each other according to the number M of unoverlapped eye positions.

15. The stereoscopic image display apparatus according to claim 14, wherein and the N views are distributed in the viewing space with a middle point of the two eyes as a reference point, wherein N/2 views are respectively distributed at the left side and a right side of the reference point and are respectively corresponding to the two eyes.

16. The stereoscopic image display apparatus according to claim 14, wherein the N views are distributed in the viewing space by evenly dividing the N views into two groups, wherein N/2 views are respectively corresponding to the two eyes.

17. A stereoscopic image display method, used in a stereoscopic image display apparatus to display image, comprising:

detecting two positions of two eyes of an observer;

sending out a plurality of view images which are pre-arranged or analyzed according to the two positions, wherein the view images have N views;

sending the view images to a display unit to be displayed;

distributing the view images on a viewing space from different directions according to a plurality of position regions on the display unit; and repeating foregoing steps, wherein the observer is n observer, and 2n positions of eyes are generated corresponding to the n observer, and a relationship between the N and n is as following;

$N \geq 4$ when n=1 and positions corresponding to two eyes are generated;

$N \geq 4n$ when $n \geq 2$, the positions of the eyes do not overlap each other, and positions corresponding to 2n eyes are generated;

$N \geq 2M$ when $n \geq 2$ and the positions of the eyes overlap each other according to the number M of unoverlapped eye positions.

18. The stereoscopic image display method according to claim 17, wherein each of the two eyes of the observer receives at least two of the plurality of view images.

* * * * *